United States Patent
Elder

(10) Patent No.: US 9,658,005 B2
(45) Date of Patent: May 23, 2017

(54) HEAT EXCHANGER SYSTEM

(75) Inventor: James S. Elder, South Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1132 days.

(21) Appl. No.: 12/948,910

(22) Filed: Nov. 18, 2010

(65) Prior Publication Data
US 2012/0125594 A1 May 24, 2012

(51) Int. Cl.
| G05D 23/00 | (2006.01) |
| F28F 19/00 | (2006.01) |
| F28D 1/053 | (2006.01) |
| F28F 27/02 | (2006.01) |
| F02C 7/14 | (2006.01) |
| F28F 17/00 | (2006.01) |
| F28D 1/04 | (2006.01) |

(Continued)

(52) U.S. Cl.
CPC ............ *F28F 19/00* (2013.01); *F02C 7/14* (2013.01); *F28D 1/053* (2013.01); *F28F 17/00* (2013.01); *F28F 27/02* (2013.01); *F01M 5/002* (2013.01); *F28D 1/0408* (2013.01); *F28D 2021/0049* (2013.01); *F28D 2021/0089* (2013.01); *F28F 2250/06* (2013.01); *Y02T 50/675* (2013.01)

(58) Field of Classification Search
CPC ............ F28D 1/053; F28D 1/0408; F28D 2021/0049; F28F 19/00; F28F 27/02; F28F 2250/06

USPC .......... 165/41, 51, 103, 297, 298; 236/34.5; 123/563; 60/39.08
See application file for complete search history.

(56) References Cited

U.S. PATENT DOCUMENTS 2,925,712 A * 2/1960 London et al. .............. 60/39.08
3,034,770 A * 5/1962 Hiersch .......................... 165/297
3,199,577 A * 8/1965 McCallister .................. 165/297
(Continued)

FOREIGN PATENT DOCUMENTS

DE 3806888 A * 9/1989
DE 4117214 12/1992
(Continued)

OTHER PUBLICATIONS

JP Office Action and English Language Translation for JP2011-251239; Office Action mailed Jul. 16, 2013.
(Continued)

*Primary Examiner* — Len Tran
*Assistant Examiner* — Gordon Jones
(74) *Attorney, Agent, or Firm* — Cantor Colburn LLP

(57) ABSTRACT

A heat exchanger system is provided having a heat exchanger with a first inlet. A first outlet is fluidly coupled to the first inlet by a plurality of first channels. A second outlet is fluidly coupled to the first inlet by a second channel, the second channel having a first portion arranged transverse to the plurality of first channels. A bypass valve having a second inlet fluidly coupled to the first outlet and a third inlet fluidly coupled to the second outlet, and a third outlet selectively fluidly coupled to the second inlet and the third inlet, the third outlet being fluidly coupled to the first inlet. When in a bypass mode of operation, the thermal transfer medium flows through a channel in the heat exchanger to de-congeal the oil within the plurality of first channels.

8 Claims, 5 Drawing Sheets

(51) Int. Cl.
*F28D 21/00* (2006.01)
*F01M 5/00* (2006.01)

(56) References Cited

U.S. PATENT DOCUMENTS

| | | | | |
|---|---|---|---|---|
| 4,791,982 | A | * | 12/1988 | Meyerhofer ................ 165/282 |
| 4,993,367 | A | * | 2/1991 | Kehrer ...................... 165/103 |
| 5,669,363 | A | * | 9/1997 | Francis ..................... 236/34.5 |
| 5,704,218 | A | | 1/1998 | Christians et al. |
| 5,715,674 | A | | 2/1998 | Reuter et al. |
| 5,768,896 | A | | 6/1998 | Kline et al. |
| 5,806,300 | A | | 9/1998 | Veilleux, Jr. et al. |
| 6,058,696 | A | | 5/2000 | Nikkanen et al. |
| 6,106,229 | A | | 8/2000 | Nikkanen et al. |
| 6,167,956 | B1 | * | 1/2001 | Bostedo et al. ............ 165/297 |
| 6,341,648 | B1 | * | 1/2002 | Fukuoka et al. .......... 165/103 |
| 6,904,965 | B2 | * | 6/2005 | Beck et al. ................ 165/175 |
| 6,997,143 | B2 | * | 2/2006 | Piccirilli et al. ............ 165/297 |
| 7,260,926 | B2 | | 8/2007 | Sabatino et al. |
| 7,273,507 | B2 | | 9/2007 | Schwalm |
| 7,300,494 | B2 | | 11/2007 | Schwalm et al. |
| 7,584,782 | B1 | | 9/2009 | Bizzarro |
| 7,658,060 | B2 | | 2/2010 | Zysman et al. |
| 7,832,467 | B2 | * | 11/2010 | Moser ................... F01M 5/002 165/103 |
| 7,938,171 | B2 | | 5/2011 | Norris et al. |
| 2010/0000717 | A1 | | 1/2010 | Finck et al. |

FOREIGN PATENT DOCUMENTS

| | | | |
|---|---|---|---|
| GB | 2433585 | A * | 6/2007 |
| JP | 3168383 | | 7/1991 |
| JP | 3184609 | | 8/1991 |
| JP | 6173708 | | 6/1994 |
| JP | 941957 | | 2/1997 |
| JP | 2002106691 | | 4/2002 |
| JP | 2003035396 | | 2/2003 |

OTHER PUBLICATIONS

Combined Search and Examination Report under Sections 17 and 18(3); Report dated Jan. 24, 2012; Application No. GB1119440.4.

\* cited by examiner

HEAT EXCHANGER SYSTEM

BACKGROUND OF THE INVENTION

The subject matter disclosed herein relates to a system for transferring thermal energy, and in particular to a heat exchanger system that can de-congeal oil within a heat exchanger at low operating temperatures.

Heat exchangers are used in a variety of applications to remove or transfer thermal energy from a first area, such as a gas turbine engine for example, to a second area, such as an air stream for example. In the case of a gas turbine engine, a heat transfer medium such as oil is circulated into a heat exchanger. The heat exchanger has a plurality of fins that extend into an air stream. The fins are thermally coupled to a plurality of small channels through which the oil flows. The thermal energy is transferred from the oil into the fins causing a reduction in the temperature of the oil. Air moving over the fins causes a transfer of thermal energy into the air stream that removes it from the system.

One issue that arises with an oil-air heat exchanger occurs during low operating temperatures. In some applications, the operating temperatures may drop below −40 C to −54 C. In these environments, the oil may congeal and the oil viscosity increases such that the pressure required to drive the flow through the heat exchanger may damage the fins. Thermal bypass valves are provided to allow the oil to flow around the heat exchanger under these conditions. The bypass operation continues until the temperature of the oil reaches a desired temperature. However, since the heat exchanger is bypassed, the oil within the heat exchanger may still at a temperature too low for flowing oil through the heat exchanger.

In other applications, multiple heat exchangers are arranged in parallel. Each of the heat exchangers has its own bypass valve that allows the oil to be warmed under cold operating conditions. Similar to the situation with a single heat exchanger, the bypassing of the oil allows a reduction in the viscosity of the bypassed oil, but oil within the heat exchangers will remain congealed. Another issue that arises with multiple heat exchangers is when an issue arises with one of the bypass valves, such as being stuck in a bypass configuration. When this occurs, a less than desired amount of thermal energy may be transferred causing higher operating temperatures. Since each of the heat exchangers is arranged in parallel, the operator may not be able to quickly identify which of the bypass valves is not operating as desired.

Accordingly, while existing oil-air heat exchangers are suitable for their intended purposes there remains a need for improvements, particularly regarding the de-congealing of oil within the heat exchanger and in reducing the number of components within the system.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

According to one aspect of the invention, a heat exchanger system is providing having a first inlet. A first outlet is fluidly coupled to the first inlet by a plurality of first channels. A second outlet fluidly is coupled to the first inlet by a second channel, the second channel having a first portion arranged transverse to the plurality of first channels. A bypass valve having a second inlet fluidly coupled to the first outlet and a third inlet fluidly coupled to the second outlet, and a third outlet selectively fluidly coupled to the second inlet and the third inlet, the third outlet being fluidly coupled to the first inlet.

According to another aspect of the invention, a heat exchanger system is provided. The heat exchanger system includes a first heat exchanger having a first inlet, a first outlet and a second outlet, the first outlet and the second outlet being fluidly coupled to the first inlet. A second heat exchanger includes a second inlet, a third outlet and a fourth outlet, the third outlet and the fourth outlet being fluidly coupled to the second inlet. A single bypass valve having a third inlet fluidly is coupled to the first outlet and the third outlet, a fourth inlet fluidly coupled to the second outlet and the fourth outlet, and a fifth outlet fluidly coupled to the first inlet and the second inlet.

According to yet another aspect of the invention, a method of operating a heat exchanger system is provided. The method includes providing a first heat exchanger with a first inlet fluidly coupled to a first outlet by a plurality of first channels and a second outlet fluidly coupled to the first inlet by a second channel. A bypass valve is provided having a second inlet selectively fluidly coupled to the first outlet, a third inlet selectively fluidly coupled to the second outlet and a third outlet fluidly coupled to the first inlet. The third inlet is fluidly coupled to the third outlet when a temperature of a first portion of a heat transfer medium in the bypass valve is below a threshold. The first portion of the heat transfer medium flows from the third outlet to the first inlet.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
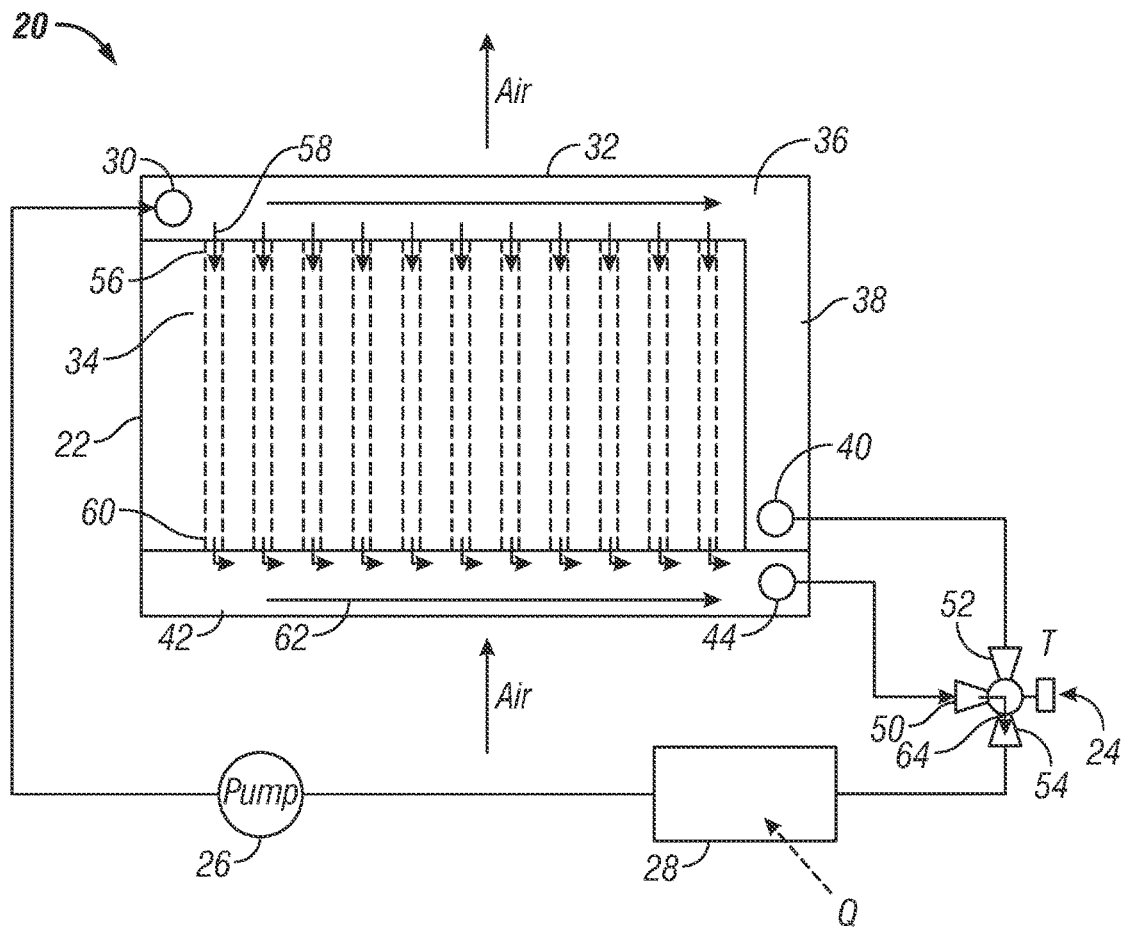
FIG. 1 is a schematic diagram of a heat exchanger system in accordance with an embodiment of the invention.
Figure 2:
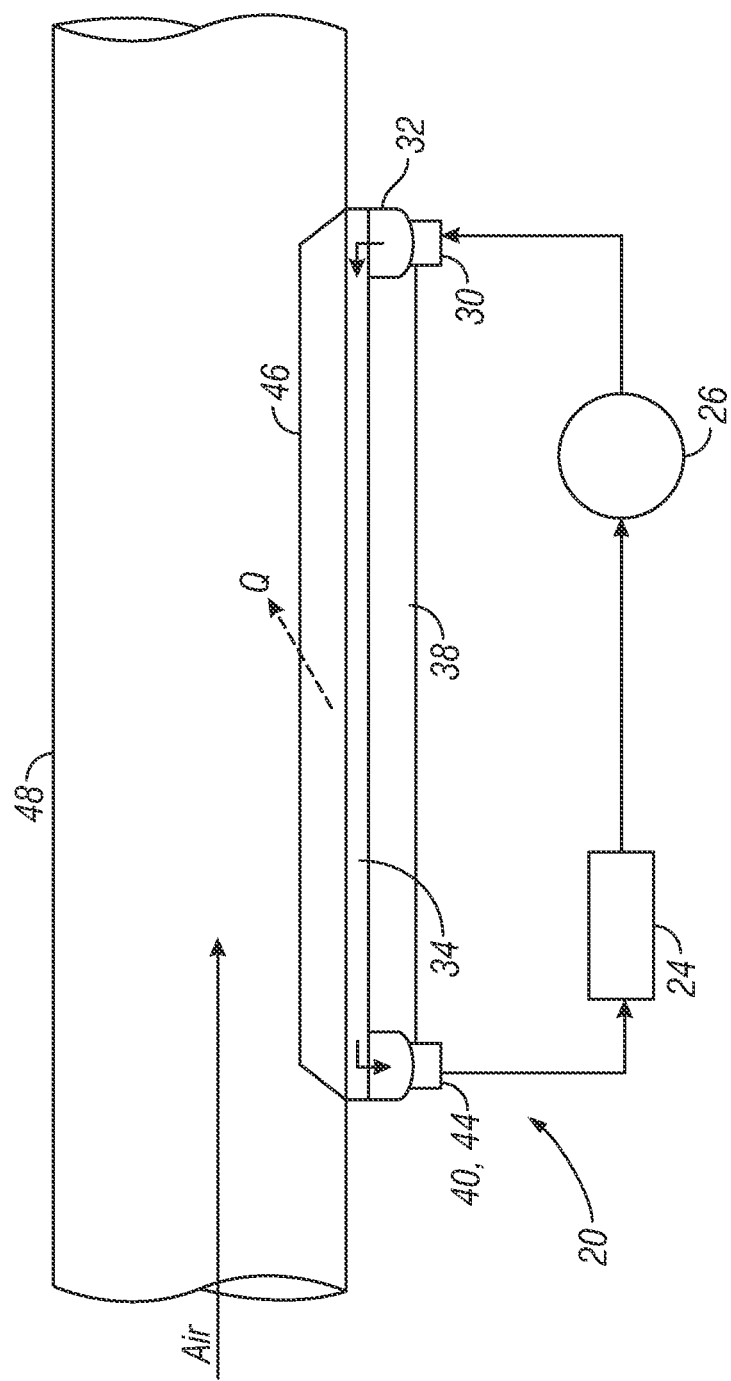
FIG. 2 is a side plan view of the heat exchanger of FIG. 1.
Figure 3:
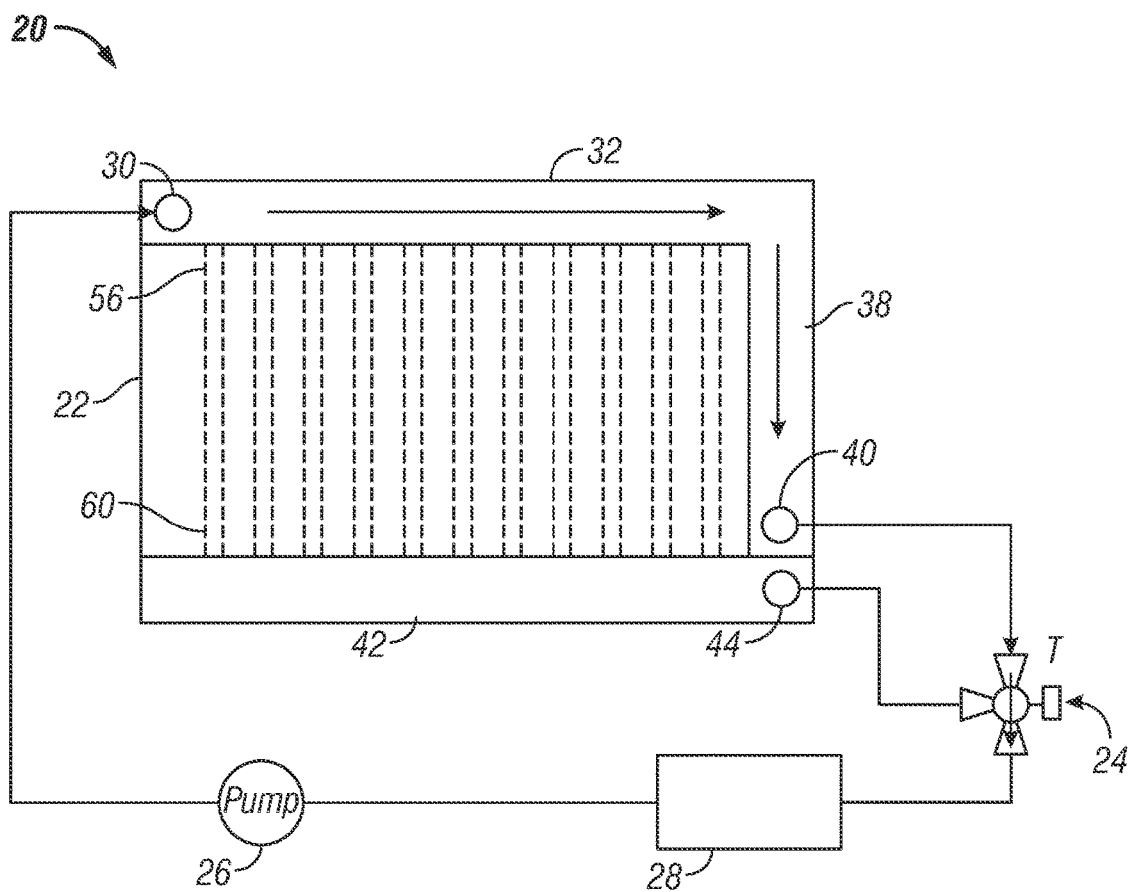
FIG. 3 is a schematic diagram of the heat exchanger system of FIG. 1 operating in a bypass mode of operation.

Heat exchanger systems are used in a variety of applications to provide the transfer of thermal energy. An exemplary embodiment of a heat exchanger system 20 is illustrated in FIGS. 1-3. The heat exchanger system 20 is a closed loop oil-air system that includes a heat exchanger 22, a bypass valve 24 and a pump 26. The heat exchanger system 20 moves the thermal transfer medium, such as oil for example, with the pump 26 from a heat generation area 28 where the temperature of the oil is increased into the heat exchanger 22. The heat exchanger 22 transfers the thermal energy from the oil into another medium such as air that removes the heat from the application. The cooled oil leaves the heat exchanger 22 via bypass valve 24 and the process repeats. It should be appreciated that the heat exchanger system 20 may include additional control devices such as check valves, couplings, conduits, pumps, sensors and controllers (not shown) as is known in the art to provide the desired thermal transfer medium flow and heat transfer characteristics.

The heat exchanger 22 includes an inlet 30 that is fluidly coupled to receive oil from the pump 26. The inlet 30 transfers the hot oil into an inlet manifold or inlet channel 32 that flows the oil across the length of the heat exchanger 22. As will be discussed in more detail below, the inlet channel 32 includes a first portion 36 and a second portion 38 that transverses the heat exchanger 22. The inlet channel 32 terminates at an outlet 40.

A plurality of channels 34 are coupled to receive oil from the inlet channel 32. Under a first mode of operation, the plurality of channels 34 flow the oil transversely across and along one side of the heat exchanger 22 to an outlet manifold 42. The outlet manifold 42 receives the oil and flows the oil to an outlet 44. In the exemplary embodiment, each of the plurality of channels 34 has a substantially smaller cross-sectional area than the inlet channel 32. In one embodiment, the heat exchanger 22 includes a plurality of fins 46. The fins 46 are thermally coupled to receive thermal energy from the oil in the plurality of channels 34 and transfer the energy to another medium such as air. In one embodiment, the heat exchanger system 20 is operated in connection with a gas turbine engine. The heat exchanger 22 is flush mounted to a duct 48, such a fan discharge duct for example, with the fins 46 extending into the air stream within the duct 48. In this embodiment, the oil may enter the heat exchanger 22 at a temperature of approximately 90 C and exit via outlet 44 at 60 C.

The oil exits the heat exchanger 22 via either the first outlet 44 or the second outlet 40 and flows into the bypass valve 24. In the exemplary embodiment, the bypass valve 24 is a thermal regulating valve having a first inlet 50 coupled to the first outlet 44, a second inlet 52 coupled to the second outlet 40 and an outlet 54. The bypass valve 24 may be an electronic, wax element, or bellows type thermal regulating valve for example. The bypass valve 24 is configured to selectively couple the outlet 54 to either the first inlet 50 or the second inlet 52 depending on a characteristic of the thermal transfer medium. In the exemplary embodiment, the characteristic is the temperature of the oil and the bypass valve 24 is a thermal regulating valve. In another embodiment, the characteristic is pressure and the bypass valve 24 may be pressure regulating type valve that selectively couples the inlets 50, 52 to the outlet 54 depending on the pressure of the oil. In one embodiment, the bypass valve 24 is integrated into the heat exchanger 22.

It should be appreciated that the position of the bypass valve 24 will determine the path that the oil flows through the heat exchanger 22. When the bypass valve 24 is configured with the first inlet 50 fluidly coupled to the outlet 54, the oil will flow through the plurality of channels 34 and exit the outlet 44 as shown in FIG. 1-2 (normal operating mode). When the bypass valve 24 is configured with the second inlet 52 fluidly coupled to the outlet 54 (FIG. 3), the oil will flow from the inlet channel first portion 36 through the second portion 38 and exit the outlet 40 (de-congealing operating mode). In the exemplary embodiment, the threshold for switching from de-congealing operating mode to normal operating mode is −40 C. It should further be appreciated that when the oil flows through the second portion 38 and not the plurality of channels 34, the transfer of thermal energy to the air will be substantially reduced.

In operation, the heat exchanger system 20 will typically be configured in the normal operating mode shown in FIGS. 1-2. In this configuration, hot oil flows from the inlet 30 into the inlet channel 32. The oil flows along the inlet channel 32 and enters each of the plurality of channels 34 at a first end 56 as indicated by the arrows 58. The oil flows through each of the plurality of channels 34 transferring thermal energy into the fins 46. Upon reaching the second end 60, the oil moves into the outlet manifold 42 and flows towards the outlet 44 as indicated by arrow 62. It should be appreciated that the temperature of the oil at the outlet 44 is substantially less than at the inlet 30. After exiting the outlet 44, the oil flows into the inlet 50 and is routed to the outlet 54 as indicated by arrow 64. After exiting the bypass valve 24, the oil absorbs more thermal energy from the heat generation area 28 and flows back to the inlet 30 to repeat the process. It should be appreciated that since the bypass valve 24 is configured to flow oil from the inlet 50 to the outlet 54, no oil will flow out of the outlet 40.

In some applications, such as an aircraft for example, the heat exchanger system 20 may be operated in environments with temperatures below −40 C. In one embodiment, when the oil in the heat exchanger system 20 drops below −40 C, the viscosity of the oil will increase (or congeal) to a point where the oil may not efficiently flow through the plurality of channels 34 due to their small cross-sectional area. When the temperature of the oil is below this threshold, the bypass valve 24 switches to allow the flow of oil from the inlet 52 to the outlet 54. Once reconfigured, the oil flowing into the inlet 30 will move along the inlet channel 32 into the second portion 38 and exit via the outlet 40. Since the cross-sectional area of the inlet channel 32 and second portion 38 are larger than the plurality of channels 34, the oil will still flow even at higher viscosities. With the plurality of channels 34 bypassed, the oil will be heated by the heat generation area 28, but will not transfer thermal energy to the fins 46. Thus the oil will be warmed and the oil viscosity reduced. Further, as the oil is warmed, the flow of oil within the inlet channel 32 and the second portion 38 will increase the temperature of the oil within the plurality of channels 34. The heating of the plurality of channels 34 de-congeals or reduces the viscosity of the oil. It should be appreciated that since the second portion 38 is arranged parallel to the channels 34, the oil within channels 34 may de-congeal individually. In other words, oil will start to flow through the heat exchanger 22 once the first channel de-congeals rather than having all of the channels 34 de-congeal simultaneously. Once a first channel 34 de-congeals, the heat will continue to pass to the next channel until the entire heat exchanger 22 is de-congealed. This provides advantages in decreasing the time until the heat exchanger becomes operational since the heat exchanger system will become at least partially operational once the first channel de-congeals. Once the temperature increases above a threshold, the bypass valve reconfigures to the normal operating mode and oil once again flows through the plurality of channels 34.

In one embodiment, the threshold for switching to normal mode is the temperature of the oil. When the temperature rises above a desired threshold (e.g. −40 C), the bypass valve 24 changes position. In other embodiment, the threshold may include a time-based component where the temperature is above a desired temperature for a predetermined amount of time for example.

Figure 4:
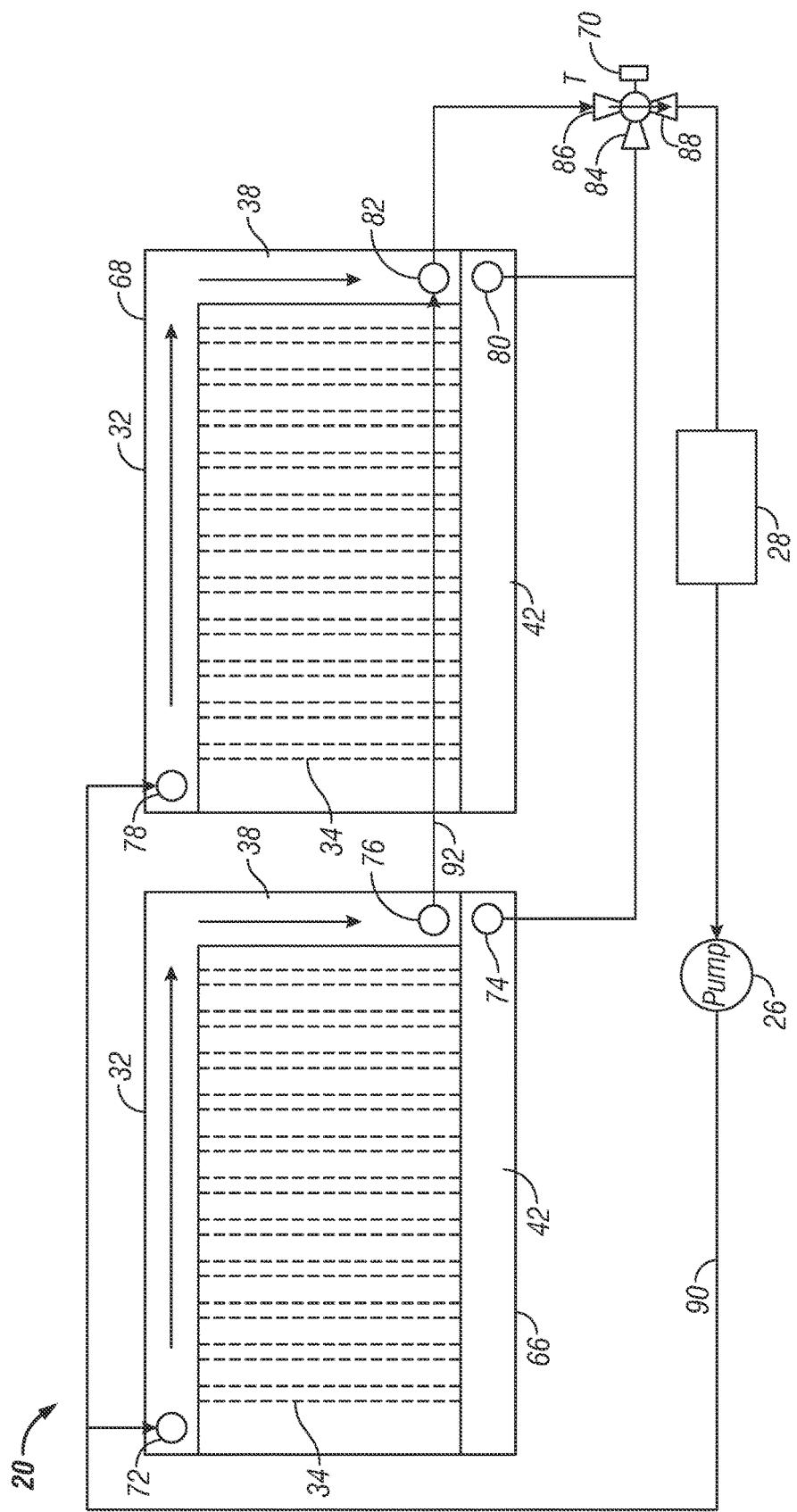
FIG. 4 is a schematic diagram of a heat exchanger system in accordance with another embodiment of the invention; and, FIG. 5 is a flow diagram of a method of operating a heat exchanger system in accordance with an embodiment of the invention.

In some applications, the heat exchanger system 20 may include multiple heat exchangers 66, 68 as shown in FIG. 4. In this embodiment, a first heat exchanger 66 is arranged in parallel with a second heat exchanger 68 and coupled to a single bypass valve 70. The heat exchanger 66 includes a first inlet 72, a first outlet 74 and a second outlet 76. Similarly, the heat exchanger 68 includes a second inlet 78, a third outlet 80 and a fourth outlet 82. The heat exchangers 66, 68 are configured substantially similar to heat exchanger 22 described herein above with each including a plurality of first channels 34, an inlet channel 32, an outlet manifold 42 and a second portion 38, where a first portion 36 is disposed substantially perpendicular to the plurality of first channels 34 and the second portion 38 is disposed substantially parallel to the plurality of first channels 34.

The bypass valve 70 includes a third inlet 84 coupled to the first outlet 74 and the third outlet 80 and a fourth inlet 86 coupled to the second outlet 76 and fourth outlet 82. A fifth outlet 88 in the bypass valve 70 is selectively coupled to the third inlet 84 and fourth inlet 86 depending on characteristic of the thermal transfer medium within the heat exchanger system 20, such as temperature or pressure of the oil for example. The oil exits the fifth outlet 88 and flows through the heat generation area 28. The pump 26 re-circulates the oil to the first inlet 72 and the second inlet 78. A first conduit 90 couples the first inlet 72 and the second inlet 78. A second conduit 92 couples the second outlet 76 and the fourth outlet 82. In one embodiment, the pressure drop in the first conduit 90 and the second conduit 92 are substantially equal.

During operation, the heat exchangers 66, 68 and the bypass valve 70 cooperate to flow the oil through either the plurality of channels 34 or the second portion 38 depending on the position of the bypass valve 70. When the bypass valve 70 is in a first position with the oil flow from the third inlet 84 to the fifth outlet 88, the oil flows through the plurality of channels 34 and thermal energy is transferred to air via fins 46 as described herein. When the bypass valve 70 is in a second position with the oil flowing from the fourth inlet 86 to the fifth outlet 88, the oil flows through the second portion 38 and thermal energy transfer to air is reduced allowing the temperature of the oil to be increased. The increase in oil temperature reduces the viscosity of the oil and allows for de-congealing of oil in the heat exchangers 66, 68 under cold operating conditions as the warmed oil flows through the inlet channel 32 and the second portion 38. The bypass valve 70 may be configured to switch between the first position and the second position based on a thermal transfer medium characteristic threshold, such as a temperature of −40 C for example, or a pressure threshold.

It should be appreciated that the coupling of multiple heat exchangers to a single bypass valve 70 provides advantages in increasing the reliability and reduction of costs. Since there is only a single bypass valve 70, diagnosis of issues with the heat exchanger system 20 may be more quickly identified reducing servicing time and costs.

Figure 5:
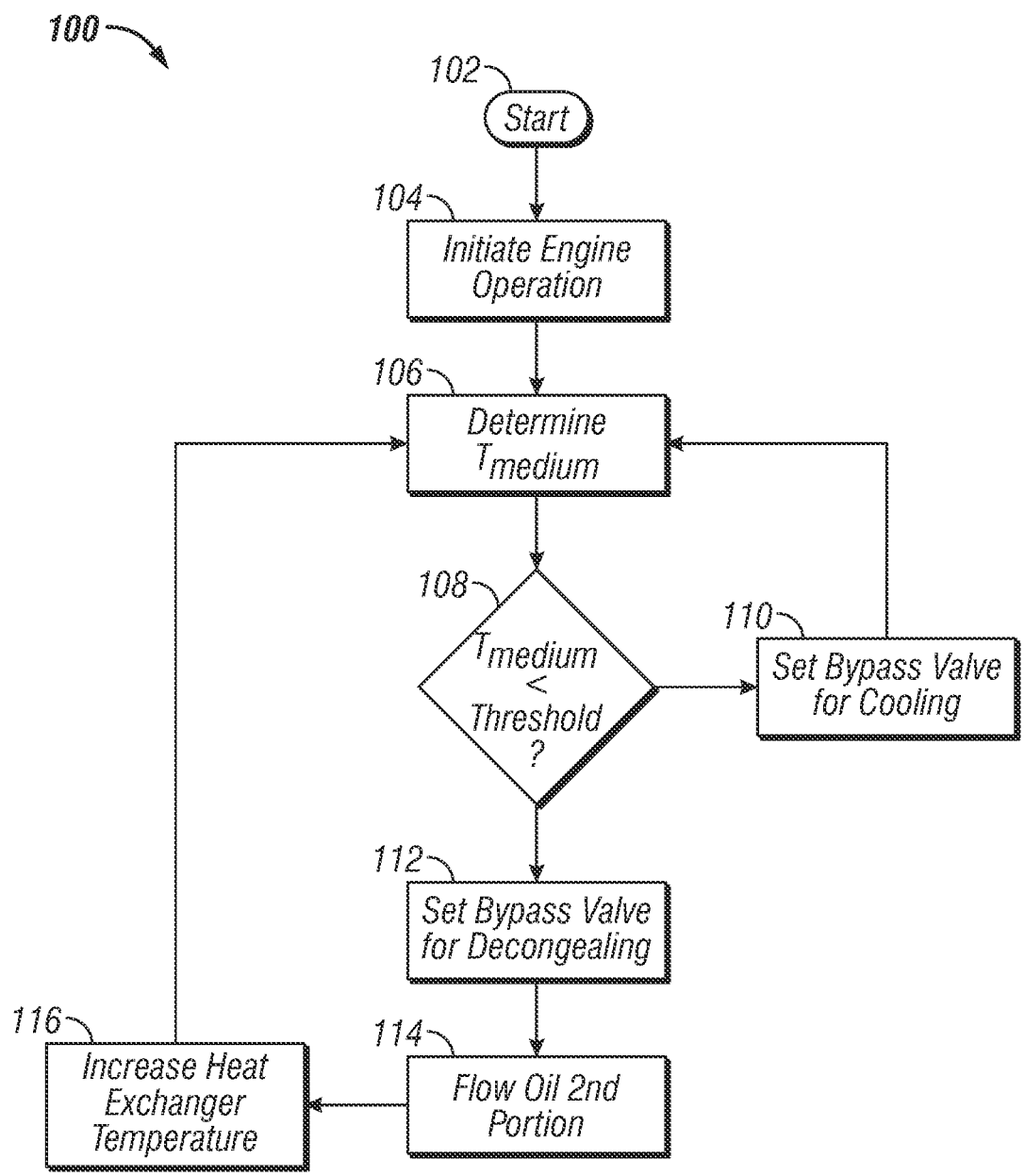

Referring now to FIG. 5, a method 100 of operating the heat exchanger system 20 is shown. The method 100 starts in block 102 and proceeds to block 104 where operation of the heat generation area 28 is initiated, such as operation of a gas turbine engine for example. The method 100 then proceeds to block 106 where the temperature $T_{medium}$ of the thermal transfer medium, such as oil for example, is determined. With the temperature of the medium measured, the method 100 proceeds to query block 108 where it is determined if the temperature $T_{medium}$ is below a threshold, such as −40 C for example. If the query block 108 returns a negative, the method 100 proceeds to block 110 where the bypass valve is set to flow medium through the plurality of channels 34 to allow the transfer of thermal energy to air.

If the query block 108 returns a positive, meaning that the viscosity of the medium is too high for efficient flow through the plurality of channels 34, the method 100 proceeds to block 112. In block 112, the bypass valve is set to flow the medium through the second portion 38. This reduces the transfer of thermal energy allowing the temperature of the thermal transfer medium to increase and a corresponding reduction in the mediums viscosity. The thermal transfer medium flows through the second portion 38 in block 114 and this flow of the medium increases the temperature of the heat exchanger in block 116. The method 100 then loops back to block 106 and continues.

Embodiments of the heat exchanger system 20 can heat the heat exchanger to de-congeal oil, increase the operating range of the heat exchanger system, reduce the amount of time before the heat exchanger system provides cooling functionality, reduce the number of bypass valves in multi-heat exchanger applications, increase reliability and reduce service costs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A heat exchanger system for a duct, the system comprising:
   a heat exchanger comprising:
      a first inlet;
      a first outlet fluidly coupled to the first inlet by a plurality of first channels, wherein the first outlet is disposed at an opposite corner from the first inlet;
      a second outlet disposed at an opposite corner from the first inlet and adjacent the first outlet, the second outlet being fluidly coupled to the first inlet by a second channel, the second channel extending about a periphery of the plurality of first channels along a first side and second side of the plurality of first channels, the second channel having a first portion extending from the first inlet and arranged transverse to the plurality of first channels, wherein the first channels are fluidly coupled to and extend from the first portion, the second channel further having a second portion disposed between an end of the first portion opposite the first inlet and the second outlet, the second portion being parallel to the plurality of first channels, wherein the first portion and second portion are thermally coupled to the plurality of first channels to decongeal oil in the plurality of first channels when an oil flows through the first portion and second portion, wherein a cross-sectional area of the second channel is larger than a cross-sectional area of the plurality of first channels;

a plurality of fins thermally coupled to the plurality of first channels, wherein the heat exchanger is flush mounted to the duct with the fins extending into an air stream within the duct;

a heat generation area; and, a bypass valve disposed between the heat generation area and the heat exchanger, the bypass valve having a first inlet fluidly coupled to the first outlet of the heat exchanger and a second inlet fluidly coupled to the second outlet of the heat exchanger, and an outlet selectively fluidly coupled to the first inlet and the second inlet, the outlet being fluidly coupled to the heat exchanger first inlet through the heat generation area, wherein the bypass valve is configured to open the bypass valve first inlet and close the bypass valve second inlet when the oil in the plurality of first channels is below a predetermined temperature.

2. The heat exchanger system of claim 1 wherein the plurality of first channels includes a first end adjacent the first inlet and a second end adjacent the first outlet, the first portion being adjacent the first end.

3. The heat exchanger system of claim 2 further comprising an outlet manifold fluidly coupled to the second end of the plurality of first channels, the first outlet being disposed at a fourth end of the outlet manifold.

4. The heat exchanger system of claim 1 wherein the bypass valve selectively couples the bypass valve outlet to the second inlet in response to a temperature of a heat transfer medium in the bypass valve being less than a threshold.

5. The heat exchanger system of claim 4 wherein the threshold is −40C.

6. The heat exchanger system of claim 1 wherein the plurality of first channels includes a third channel and a fourth channel, the third channel being adjacent to and parallel to the second portion, the fourth channel being arranged adjacent the third channel opposite the second portion.

7. The heat exchanger system of claim 6 wherein the second portion is thermally coupled to the third channel to transfer heat to the oil in the third channel when the third inlet is open, the second portion further being positioned to transfer heat to the oil in the third channel prior to transferring heat to the oil in the fourth channel.

8. The heat exchanger system of claim 7 wherein the third channel is arranged and configured in operation to transfer heat to oil in the fourth channel.

* * * * *